(12) United States Patent
Nema et al.

(10) Patent No.: US 11,677,713 B2
(45) Date of Patent: Jun. 13, 2023

(54) DOMAIN-NAME-BASED NETWORK-CONNECTION ATTESTATION

(71) Applicant: VMWARE, INC., Palo Alto, CA (US)

(72) Inventors: Kanika Nema, Pune (IN); Daniel G. Wing, Truckee, CA (US); Goresh Musalay, Pune (IN)

(73) Assignee: VMware, Inc., Palo Alto, CA (US)

( * ) Notice: Subject to any disclaimer, the term of this patent is extended or adjusted under 35 U.S.C. 154(b) by 383 days.

(21) Appl. No.: 16/253,238

(22) Filed: Jan. 22, 2019

(65) Prior Publication Data

US 2020/0112537 A1     Apr. 9, 2020

(30) Foreign Application Priority Data

Oct. 5, 2018  (IN) .............................. 201841037840

(51) Int. Cl.
| | |
|---|---|
| *H04L 61/4511* | (2022.01) |
| *H04L 61/2514* | (2022.01) |
| *H04L 61/10* | (2022.01) |
| *H04L 61/58* | (2022.01) |
| *H04L 61/5007* | (2022.01) |

(52) U.S. Cl.
CPC .......... *H04L 61/4511* (2022.05); *H04L 61/10* (2013.01); *H04L 61/2514* (2013.01); *H04L 61/5007* (2022.05); *H04L 61/58* (2022.05)

(58) Field of Classification Search
CPC . H04L 61/10; H04L 61/1511; H04L 61/6009; H04L 63/10–101; H04L 63/0227–0245; H04L 63/14–1441; H04L 63/20–205; H04L 63/08; H04L 29/12066; H04L 61/2514; H04L 61/4511; H04L 61/5007; H04L 61/58; G06F 21/53–56; G06F 21/57–577; H04W 12/08–0808
See application file for complete search history.

(56) References Cited

U.S. PATENT DOCUMENTS

| | | | | |
|---|---|---|---|---|
| 6,118,768 A | * | 9/2000 | Bhatia ................. | H04L 12/2856 370/254 |
| 7,296,155 B1 | * | 11/2007 | Trostle ................ | H04L 63/1441 713/170 |
| 7,600,011 B1 | * | 10/2009 | Urbanek ............. | H04L 61/4511 709/226 |
| 7,792,994 B1 | * | 9/2010 | Hernacki ................ | H04L 12/66 709/229 |
| 7,849,502 B1 | * | 12/2010 | Bloch ................... | H04L 63/168 726/11 |

(Continued)

*Primary Examiner* — Mohamed A. Wasel

(57) ABSTRACT

A domain-name-based network-connection attestation system provides for more user friendly and less error prone (compared to IP-address-based attestation systems) updating of a whitelist used to determine whether or not to allow a requested network connection. A guest agent extracts from a DNS reply a domain name, and an IP address mapped to a domain name. The agent enters these values in an agent DNS cache. When a process requests a connection to an IP address, the agent uses the IP address to determine the domain name from the agent DNS cache. The agent then determines whether the IP address is mapped to the process identity in a domain-name-based whitelist. If it is, the connection is attested to and allowed; if it is not, a secondary IP address whitelist can be checked.

6 Claims, 4 Drawing Sheets

(56) References Cited

U.S. PATENT DOCUMENTS

| | | | |
|---|---|---|---|
| 8,682,812 B1* | 3/2014 | Ranjan | H04L 63/1425 706/12 |
| 8,762,298 B1* | 6/2014 | Ranjan | H04L 63/14 706/12 |
| 9,325,735 B1* | 4/2016 | Xie | H04L 63/20 |
| 9,363,282 B1* | 6/2016 | Yu | H04L 63/0218 |
| 9,832,209 B1* | 11/2017 | Cooley | H04L 63/1408 |
| 10,027,688 B2* | 7/2018 | Perdisci | H04L 63/1416 |
| 10,033,691 B1* | 7/2018 | Mizik | H04L 61/1511 |
| 10,362,057 B1* | 7/2019 | Wu | H04L 63/1491 |
| 10,511,498 B1* | 12/2019 | Narayan | H04L 43/026 |
| 10,965,789 B2* | 3/2021 | Leung | H04L 63/10 |
| 2008/0052758 A1* | 2/2008 | Byrnes | H04L 63/0263 726/1 |
| 2008/0082662 A1* | 4/2008 | Dandliker | H04L 63/10 709/225 |
| 2008/0086574 A1* | 4/2008 | Raciborski | H04L 61/1541 709/245 |
| 2008/0222306 A1* | 9/2008 | Bhakta | H04L 61/1552 709/245 |
| 2008/0222307 A1* | 9/2008 | Bhakta | H04L 61/1552 709/245 |
| 2009/0198817 A1* | 8/2009 | Sundaram | H04L 67/1095 709/227 |
| 2009/0222584 A1* | 9/2009 | Josefsberg | H04L 61/1511 709/245 |
| 2010/0269174 A1* | 10/2010 | Shelest | H04L 29/12066 707/E17.014 |
| 2010/0318681 A1* | 12/2010 | Shi | H04L 63/1483 709/245 |
| 2011/0231897 A1* | 9/2011 | Tovar | H04L 63/108 726/1 |
| 2012/0084423 A1* | 4/2012 | McGleenon | H04L 61/1511 709/223 |
| 2012/0096261 A1* | 4/2012 | Ko | H04L 63/0236 713/168 |
| 2012/0124239 A1* | 5/2012 | Shribman | H04L 61/1552 709/245 |
| 2012/0179801 A1* | 7/2012 | Luna | H04L 61/1511 709/223 |
| 2012/0324094 A1* | 12/2012 | Wyatt | H04L 43/0876 709/224 |
| 2013/0031625 A1* | 1/2013 | Lim | G06F 21/552 726/22 |
| 2013/0124738 A1* | 5/2013 | Lynch | H04L 61/1511 709/227 |
| 2013/0227704 A1* | 8/2013 | Boivie | G06F 21/31 726/27 |
| 2014/0019601 A1* | 1/2014 | Blacka | G06F 16/9566 709/223 |
| 2014/0075553 A1* | 3/2014 | Hansen | H04L 63/14 726/22 |
| 2014/0137189 A1* | 5/2014 | Hansen | G06F 21/51 726/3 |
| 2015/0026341 A1* | 1/2015 | Blacka | H04L 63/168 709/225 |
| 2015/0058488 A1* | 2/2015 | Backholm | H04L 47/286 709/226 |
| 2015/0089625 A1* | 3/2015 | Swanson | H04L 63/0227 726/11 |
| 2015/0150079 A1* | 5/2015 | Hyatt | H04L 43/045 726/1 |
| 2015/0195299 A1* | 7/2015 | Zoldi | H04L 63/1408 726/25 |
| 2015/0237001 A1* | 8/2015 | Ivanov | H04L 61/10 709/245 |
| 2015/0326530 A1* | 11/2015 | Wood | G06F 21/554 726/11 |
| 2015/0358285 A1* | 12/2015 | Ellard | H04L 41/00 726/12 |
| 2016/0006693 A1* | 1/2016 | Salcedo | H04L 63/0236 726/1 |
| 2016/0057167 A1* | 2/2016 | Bach | H04L 51/18 726/23 |
| 2016/0080395 A1* | 3/2016 | Reddy | H04L 63/0236 726/23 |
| 2016/0142375 A1* | 5/2016 | Tubi | H04L 63/0272 726/1 |
| 2016/0142432 A1* | 5/2016 | Manadhata | H04L 63/101 726/25 |
| 2016/0164946 A1* | 6/2016 | Bazzi | G06F 21/53 709/219 |
| 2016/0248813 A1* | 8/2016 | Byrnes | G06F 16/24578 |
| 2016/0294862 A1* | 10/2016 | Tao | H04L 63/1416 |
| 2016/0301656 A1* | 10/2016 | Akcin | H04L 61/1511 |
| 2016/0323409 A1* | 11/2016 | Kolhi | H04L 61/1511 |
| 2016/0330287 A1* | 11/2016 | Smith | H04L 12/2812 |
| 2016/0337333 A1* | 11/2016 | Rollet | H04L 63/083 |
| 2016/0373409 A1* | 12/2016 | Zhu | H04L 61/1511 |
| 2016/0380975 A1* | 12/2016 | Reddy | H04L 61/1511 726/12 |
| 2017/0041332 A1* | 2/2017 | Mahjoub | H04L 43/0876 |
| 2017/0063798 A1* | 3/2017 | Lapidous | H04L 63/029 |
| 2017/0063929 A1* | 3/2017 | Burbridge | H04L 61/5014 |
| 2017/0163632 A1* | 6/2017 | Walewski | H04L 61/2007 |
| 2017/0163670 A1* | 6/2017 | Manadhata | H04L 63/1441 |
| 2017/0237706 A1* | 8/2017 | Wei | H04L 12/28 370/392 |
| 2017/0289101 A1* | 10/2017 | Farag | H04L 61/2046 |
| 2017/0323102 A1* | 11/2017 | Manadhata | H04L 61/1511 |
| 2017/0331780 A1* | 11/2017 | Reddy | H04L 61/1511 |
| 2017/0353494 A1* | 12/2017 | Krinos | H04L 63/20 |
| 2017/0353496 A1* | 12/2017 | Pai | H04L 63/08 |
| 2018/0048673 A1* | 2/2018 | Hunt | G06F 21/562 |
| 2018/0048729 A1* | 2/2018 | Duvdevani | H04L 67/2814 |
| 2018/0063181 A1* | 3/2018 | Jones | G06F 21/577 |
| 2018/0063182 A1* | 3/2018 | Jones | G06F 21/6218 |
| 2018/0077120 A1* | 3/2018 | Baughman | H04L 63/1408 |
| 2018/0103058 A1* | 4/2018 | St. Pierre | H04L 63/1433 |
| 2018/0139238 A1* | 5/2018 | Schultz | H04L 63/1491 |
| 2018/0167361 A1* | 6/2018 | Xiao | H04L 29/06 |
| 2018/0176241 A1* | 6/2018 | Manadhata | G06F 16/2477 |
| 2018/0198824 A1* | 7/2018 | Pulapaka | H04L 63/20 |
| 2018/0255083 A1* | 9/2018 | Rao | H04L 63/1425 |
| 2018/0300475 A1* | 10/2018 | Zhang | G06F 21/53 |
| 2018/0314648 A1* | 11/2018 | Hulick | G06F 9/4552 |
| 2019/0007366 A1* | 1/2019 | Voegele | H04L 61/305 |
| 2019/0081952 A1* | 3/2019 | Wood | H04L 63/1491 |
| 2019/0089748 A1* | 3/2019 | Manor | H04L 63/1441 |
| 2019/0158459 A1* | 5/2019 | Vaikar | H04L 67/2842 |
| 2019/0158497 A1* | 5/2019 | Diaz Cuellar | H04L 63/083 |
| 2019/0238572 A1* | 8/2019 | Manadhata | G06F 40/284 |
| 2019/0238573 A1* | 8/2019 | Manadhata | H04L 61/3025 |
| 2019/0253385 A1* | 8/2019 | Gurney | H04L 63/108 |
| 2019/0268305 A1* | 8/2019 | Xu | H04L 63/20 |
| 2019/0334931 A1* | 10/2019 | Arlitt | H04L 63/1425 |
| 2019/0363941 A1* | 11/2019 | Fujimoto | H04L 45/38 |
| 2020/0007548 A1* | 1/2020 | Sanghavi | H04L 61/256 |
| 2020/0252367 A1* | 8/2020 | Yang | H04L 47/286 |
| 2020/0267023 A1* | 8/2020 | Fujimoto | H04L 69/16 |

* cited by examiner

DOMAIN-NAME-BASED NETWORK-CONNECTION ATTESTATION

RELATED APPLICATIONS

Benefit is claimed under 35 U.S.C. 119(a)-(d) to Foreign Application Serial No. 201841037840 filed in India entitled "DOMAIN-NAME-BASED NETWORK-CONNECTION ATTESTATION", on Oct. 5, 2018, by VMware, Inc., which is herein incorporated in its entirety by reference for all purposes.

BACKGROUND

A computer system's security can be threatened when an application, running on the computer system, makes a "dangerous" connection. For example, the application may connect to a site designed to infiltrate or disrupt the computer system. Alternatively, a connection can be made by or via the application to a "good" site to infiltrate or disrupt the good site. For this reason, it can be useful to require attestation that the process requesting the connection should be allowed to make the connection.

DETAILED DESCRIPTION

The present invention provides a management agent for domain-name-based network-connection attestation. When an application process wants to connect to a network domain, the underlying operating system (OS) may use an OS DNS (Domain Name Service) cache to translate the domain name to an Internet Protocol (IP) address understood by the network. The process can then make a connection request specifying the IP address. The original domain name is not visible to the management agent, so the management agent maintains an agent DNS cache for translating the requested IP address back into the domain name. The recovered domain name can then be checked against a domain-name-based whitelist that associates domain names to process identities to help determine whether or not a requested connection should be allowed.

Compared to an IP-based connection whitelist based only on IP addresses, a domain-name-based connection whitelist is more readily comprehended so that updating the whitelist is less cumbersome and less subject to errors. The present invention provides for domain-name (DN) connection whitelists used in lieu of or in addition to IP connection whitelists based on IP addresses.

Figure 1:
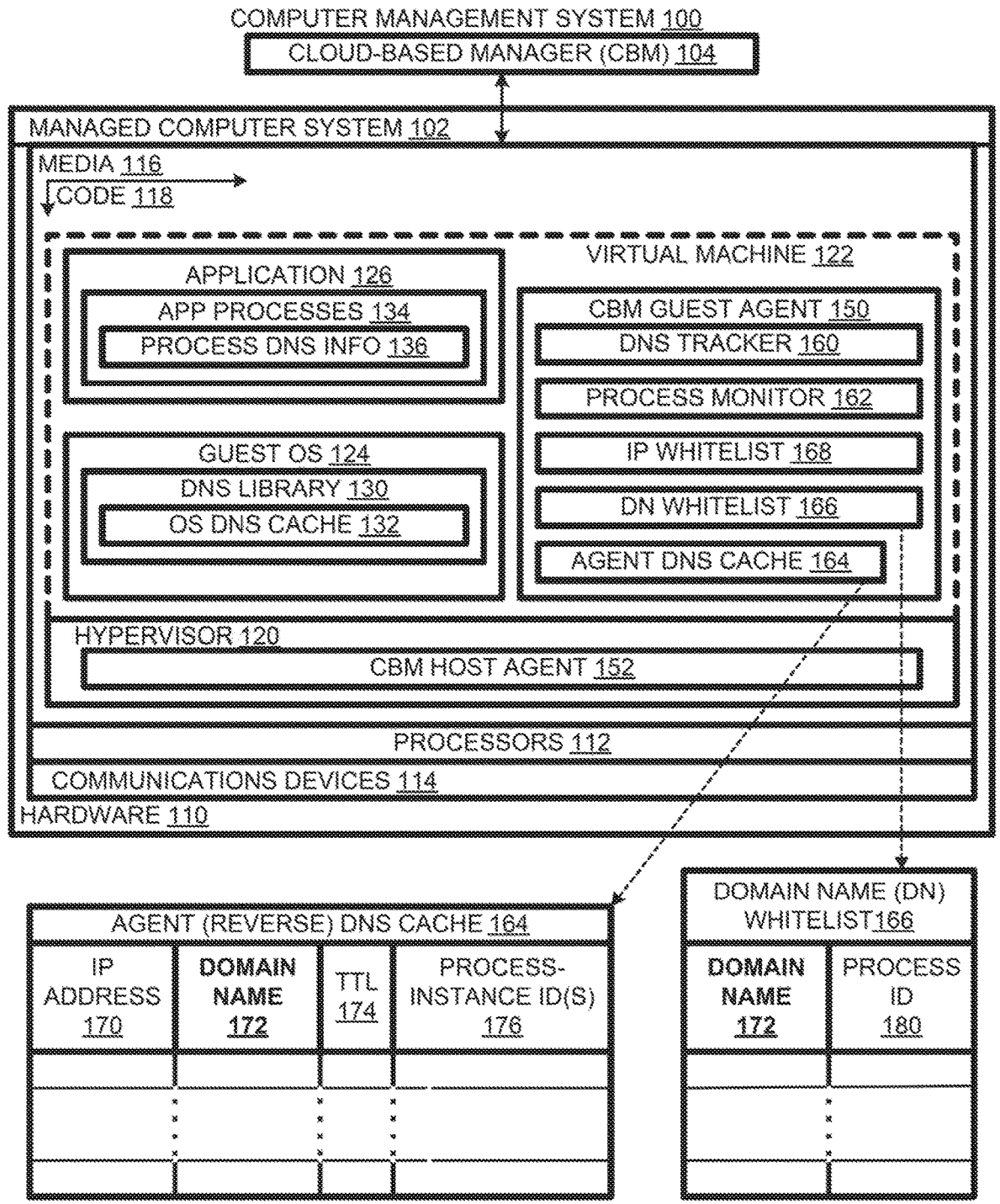
FIG. 1 is a schematic diagram of a computer system employing domain-name-based network-connection attestation.

As shown in FIG. 1, a computer-management system 100 includes a managed computer system 102 and a cloud-based manager (CBM) 104. Managed computer system 102 includes hardware 110. Hardware 110 includes processors 112, communications devices 114, and non-transitory media 116. Media 116 is encoded with code 118. Code 118 defines a hypervisor 120 and a virtual machine 122 hosted by hypervisor 120. Hypervisor 120 serves as a host operating system that virtualizes hardware 110 to support virtual machine 122. Note that CBM 104 helps manage computer system 102 and other computer systems. Managed computer system 102 can include additional hypervisors, and hypervisor 120 can support additional virtual machines.

Virtual machine 122 executes a guest operating system (guest OS) 124, on which, in turn, runs an application 126. Guest OS 124 includes a domain-name-service (DNS) library 130, which, in turn, includes an OS DNS cache 132 that maps domain names to IP addresses. OS DNS cache 132 can be used to translate a domain name for a domain to which a process is to connect into an IP address that a network can use to route the connection to the desired domain. An application process 134 can also retain an IP address for a domain to which the process may try to reach, obviating the need to request a translation by the OS.

CBM guest agent 150 is installed in virtual machine 122. CBM guest agent 150 is designed to communicate with and coordinate with cloud-based manager 104, e.g., via a CBM host agent 152 residing in hypervisor 120. More generally, a guest agent would be installed in each virtual machine of managed computer system 102, and each guest agent would communicate with CMB 104 via a respective host agent installed in a respective hypervisor on which that virtual machine runs.

CBM agent 150 includes a DNS tracker 160, a process monitor 162, an agent DNS cache 164, a domain-name (DN) connection whitelist 166, and an IP address (IP) whitelist 168. In an alternative embodiment, there is no IP connection whitelist. IP whitelist 168 can be used, for example, when an application requests a connection to a static IP address directly. In such a case, no DNS query is made and there is no opportunity for the guest agent to determine the corresponding domain name and, therefore, there is no opportunity to use the domain-name whitelist to validate a connection request.

In the illustrated embodiment, the IP whitelist is populated by watching DNS responses to DNS queries and by examining the DN whitelist, while DN entries are configured by an administrator using the CBM user interface and are pushed from the CBM to the guest agent. Therefore, the domain-name entries are considered to be a better abstraction than the IP entries. For this reason, an entry from the IP whitelist is used only if there is no applicable entry in the DN whitelist. Thus, the IP whitelist need not even be checked if there is a match in the DN whitelist. In practice, the IP whitelist can be very small, with most entries specifying IP addresses for machines, like the domain-name server, well-known within a private network.

When an application process 134 submits a domain name for translation into an IP address, DNS library 130 checks OS DNS cache 132 for a corresponding entry. If such an entry is not found, DNS library 130 generates a DNS query, to which a domain-name server may respond with a DNS reply specifying the domain name, an associated IP address, and a time-to-live (TTL). The TTL specifies a duration during which the association between the IP address and the domain name is guaranteed; the guarantee expires when the TTL expires (is no longer valid). The DNS library 130 then associates the IP address and the TTL with the domain name in OS DNS cache 132 for future reference. The IP address is passed to the application process requesting the translation, which may be retained by the application process to obviate the need to request a translation from the guest OS.

Concomitantly, to track OS DNS cache 132, DNS tracker 160 enters a record (aka, "entry", corresponding to a row of agent DNS cache as depicted in FIG. 1) to agent DNS cache 164 associating the domain name 172 and TTL value 174 with the returned IP address 170. Note that, while OS DNS cache 132 is designed for forward DNS lookups (input is domain name, output is IP address), the agent DNS cache 164 is designed for reverse DNS lookups (input is IP address, output is domain name). Thus, while it is not privy to the domain name as it is passed to the OS for translation, the guest agent can recover the domain name given the IP address using the reverse lookup agent DNS cache.

Once it is informed of the IP address associated with a domain to which a connection is sought, the application process can issue a connection request specifying the IP address. When the connection request is made, process monitor 162 can capture the IP address 170 and the process-instance identifier (PIID) 176 of the requester. In the event that the requested IP address is represented in the agent DNS cache 164, the PIID can then be associated with the IP address 170 in the agent DNS cache 164. Note that multiple PIIDs can be associated with a single IP address and a single PIID can be associated with multiple IP addresses in the agent DNS cache.

When an application process terminates, the agent deletes its PIIDs from the agent DNS cache. When: 1) the last PIID associated with an IP address is deleted, and 2) the corresponding TTL has expired, the entry for the IP address is deleted (or invalidated) from the agent DNS cache. Note that the OS DNS cache does not store PIIDs, but simply deletes an entry when the corresponding TTL expires.

In an event in which the requested IP address is not represented in the agent DNS cache, then CBM guest agent 150 cannot recover the associated domain name. This can happen when an application requests a connection based on a static IP address without requesting a translation from a domain name. Since the domain name 172 cannot be determined, it cannot be looked up in DN whitelist 166 to determine whether the requestor has a process identity 180 that would authorize it to connect to the desired domain. (The process identity can include the process path, the process name, and a process hash (checksum of the binary, all of which are specified in the connection request)). In the event there is no match in DN whitelist 166, the IP whitelist can be checked for a match of the requested IP address and identity for the requesting process. If there is no match in either whitelist, CBM agent 150 can send out an alert or other notification that it cannot attest to the requested connection.

Figure 2A:
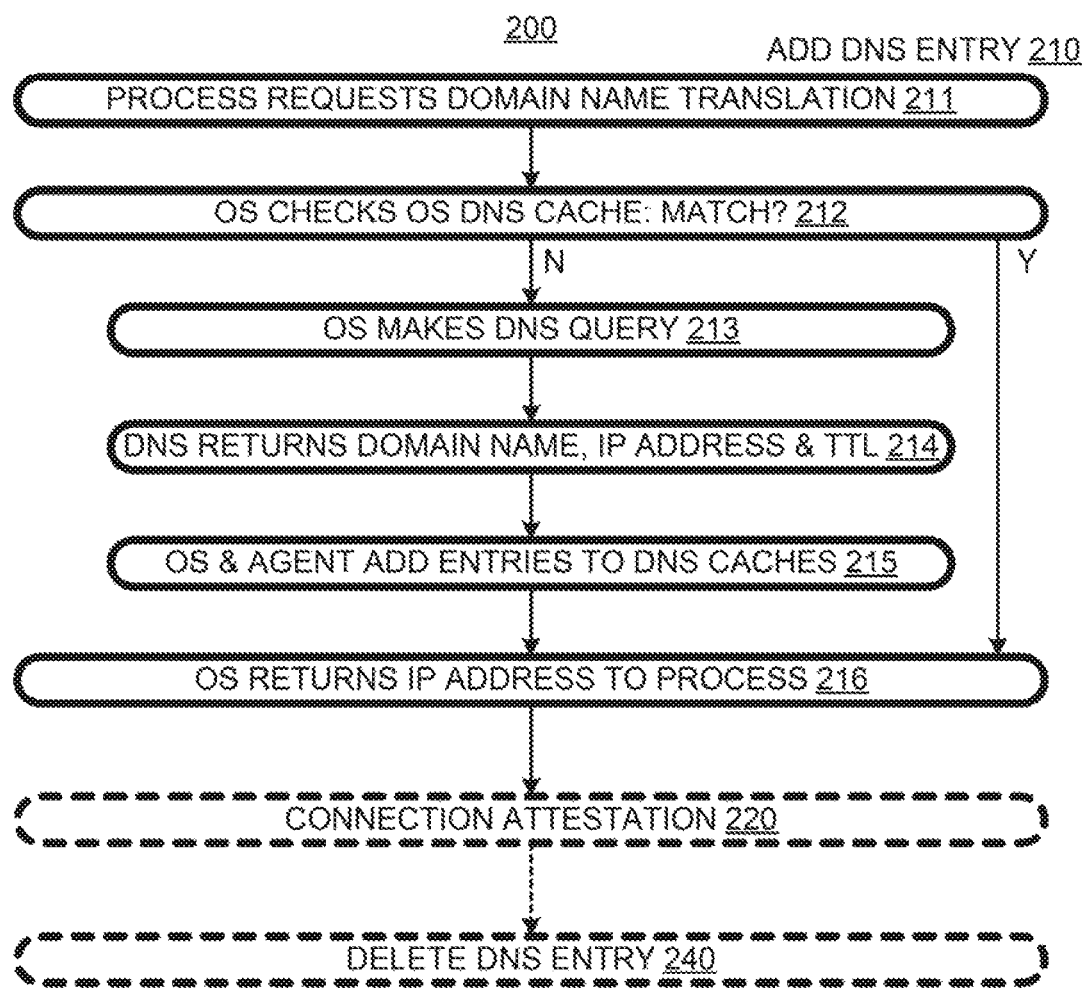
FIGS. 2A, 2B, and 2C present a flow chart of a domain-name-based network-connection attestation process implementable in the system of FIG. 1 and in other systems.
Figure 2B:
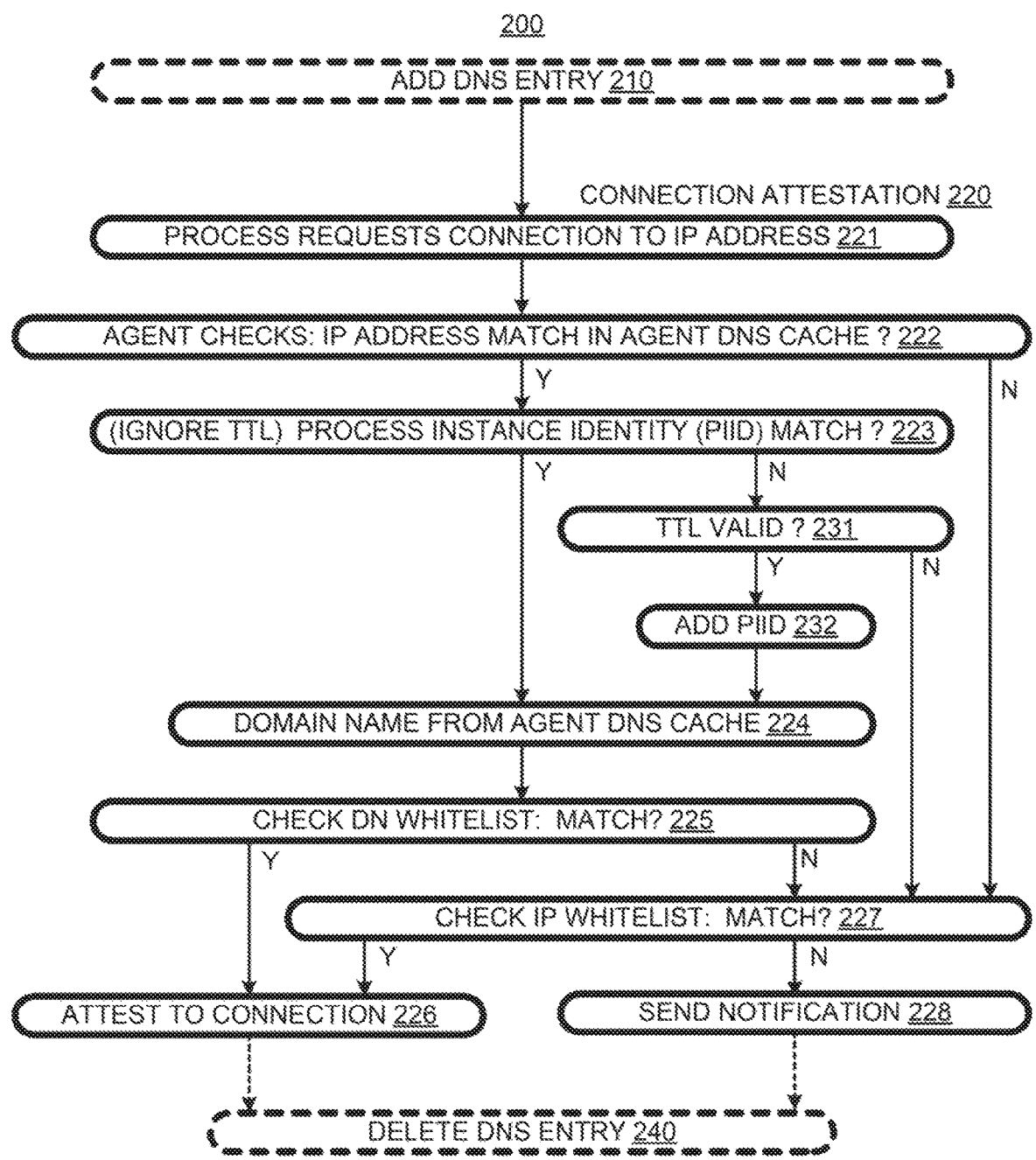
Figure 2C:
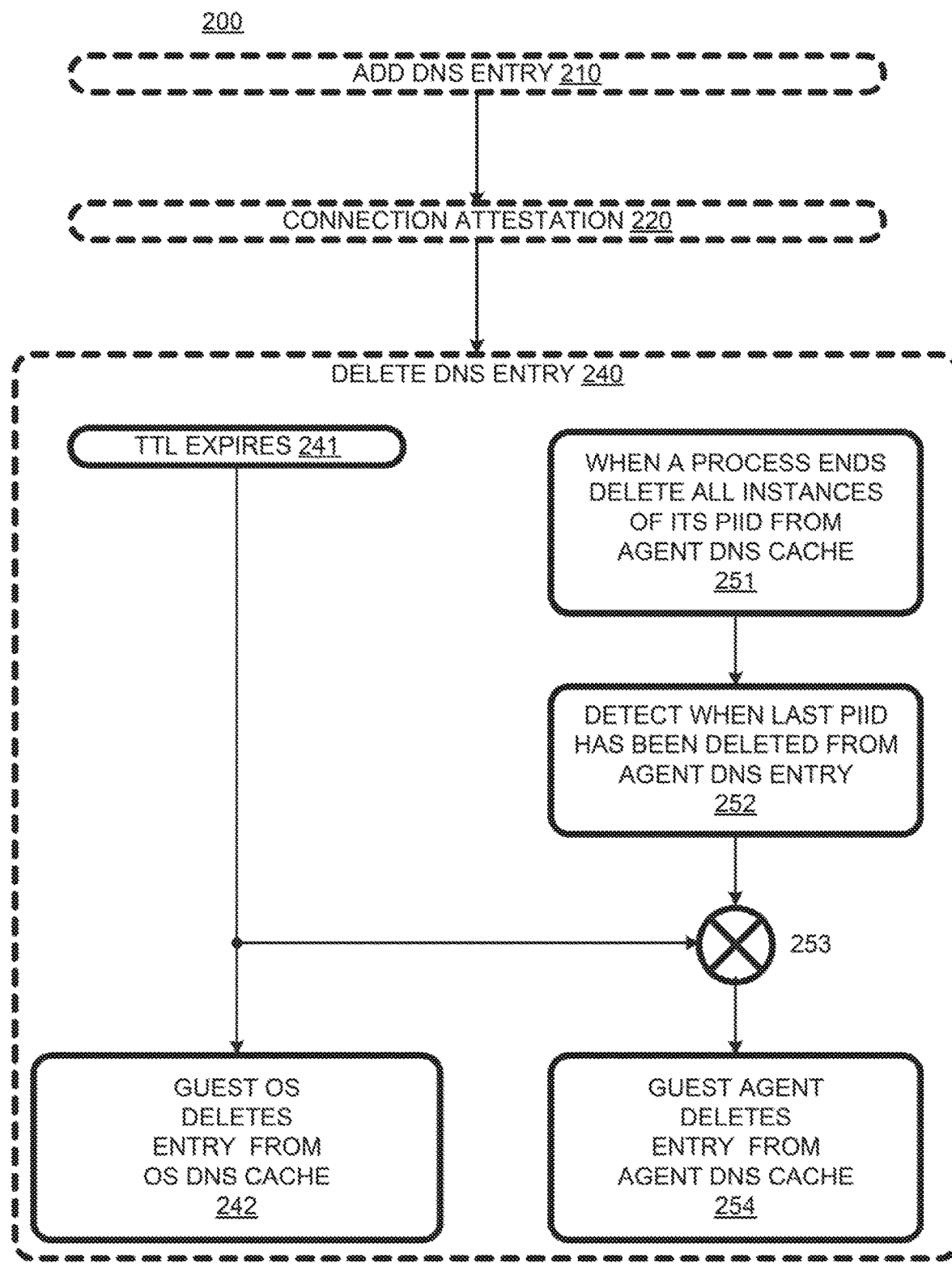

A domain-name-based network-connection attestation process 200 is flow charted in FIGS. 2A, 2B, and 2C. Process 200 has an "add DNS entry" phase 210 (FIG. 2A), a "connection attestation" phase 220, and a "delete DNS entry" phase 240 (FIG. 2B). "Add DNS entry" phase 210 begins at 211 when an application process submits a request to its OS to translate a domain name into an IP address. Note: to ensure that no DNS requests are missed, we ensure that the guest agent starts before the OS DNS cache service. In fact, as early in the boot as possible. Additionally, the agent on start dears the OS cache in cases where it may have come up after the OS DNS cache service.

At 212, a DNS library of the OS checks its OS DNS cache to determine if the cache provides the desired translation. If no match is found in the OS DNS cache, then, at 213, the DNS library of the OS makes a DNS query specifying the domain name. At 214, a (remote) domain-name server returns an IP address for the domain to which the requesting application process intends to connect. More specifically, the DNS server generates a reply specifying the submitted domain name, the IP address associated with the named domain, and a TTL during which the association between the IP address and the domain can be assumed to persist. (Once the TTL expires, the domain may assume a different IP address.)

At 215, the returned information is entered into the OS DNS cache and the agent DNS cache. The DNS library maps the submitted domain name to the returned IP address and TTL in the OS DNS cache. The DNS tracker of the management agent maps the returned IP address to the submitted domain name and the returned TTL in the agent DNS cache. Since agent DNS entries are based on queries by the OS DNS library, there is no PIID that can be associated with an IP address extracted from a DNS reply; PIIDs are added as processes make connection requests specifying the IP address of an entry in the agent DNS cache.

At 216, the OS returns the IP address, returned in response to the DNS query, to the requesting process. Note that, if at 212, the submitted domain name is found in the OS DNS cache, then, at 216, the corresponding IP address is returned to the requesting application process, and actions 213-215 are bypassed.

As shown in FIG. 2B, connection-attestation phase 220 of process 200 begins, at 221, with a process requesting a connection to an IP address. At 222, the guest agent checks the agent DNS cache to recover the domain name for the requested connection. In other words, the guest agent looks in the agent DNS cache for a match to the requested IP address. Most often, the IP address will have been provided directly or indirectly from a DNS server so that it will be represented in the agent DNS cache.

In the case the requested IP address matches an entry in the agent DNS cache, there is a further check at 223 to determine if the process identity (PID) of the requesting process is associated with the IP address in the agent DNS cache. If so, at 224, the agent recovers the domain name associated with the requested IP address from the agent DNS cache. Note that the domain name is recovered at 224 whether or not the TTL had expired at 223 (and thus, whether or not the corresponding entry in the OS DNS cache had been deleted). Thus, when a process has stored a domain name to IP address mapping, it can continue to use that mapping after the TTL has expired and until the process itself has terminated.

At 225, the agent can search a domain-name whitelist for a match to the recovered domain name to determine whether or not the domain name is associated with a process identity (PID) for the requesting process in the domain-name whitelist. If the process identity for the requesting process is associated, in the domain-name whitelist, with the domain name associated with the requested connection, then, at 226, the connection is attested to and allowed. If, there is no such domain-name match, the IP whitelist can be checked for a match at 227. If there is no match in either whitelist, an alert or other notification is sent at 228.

In an event in which the requested IP address is represented in the agent DNS cache but not (as determined at 223) in association with the process instance identity (PID) of the requesting process, then at 231, a check is made to determine whether the TTL associated with the requested IP address in the agent DNS cache is valid or invalid (expired). In an event in which the TTL is valid, then, at 232, the PIID for the requesting process is associated with the requested IP address in the agent DNS cache. Note that more than one PIID may be associated with an IP address in the agent DNS cache. On the other hand, if, at 231, if is determined that the TTL is invalid, then the PIID is not added at 232. This ensures that a malicious process does not misuse the cache to make connections on cached mappings. Instead, at 227 the IP whitelist is checked for a match to the requested IP address. Depending on the outcome of 227, the requested connection may be attested to at 226 or a notification may be sent at 227.

If at 222, there is no match for the requested IP address in the agent DNS cache, only the IP address whitelist is checked (at 227). If the IP address and process name are matched, the connection is attested to and allowed at 226. If there is no match in the IP address whitelist, a notification is sent at 228. In some embodiments, the IP address whitelist is checked before or concurrently with the check of the domain-name whitelist.

Agent DNS cache 164 is designed so that its entries are a superset of the entries in OS DNS cache 132. For each entry in OS DNS cache 132 mapping a domain name to an IP address, there is an entry in agent DNS cache 164 mapping the IP address to the domain name. (Due to deletion procedures, detailed below, agent DNS cache 164 can have entries for which the OS DNS cache lacks corresponding entries.) Therefore, if guest agent 150 cannot find a requested IP address in agent DNS cache 164, then the IP address is also not represented in OS DNS cache 132.

When the guest OS returns an IP address in response to a process request to translate a domain name, the application process may retain the IP address to obviate the need for requesting the OS to provide the same translation in the future. The application process typically does not know the TTL and does not retire the association between the domain name and the IP address when the TTL in the cache expires. As a result, an application process may request a connection to an IP address without checking with the OS to determine if that IP address is still associated with the domain of interest.

If, contrary to fact, the corresponding entry mapping the requested IP address to a domain name had been deleted from the agent DNS cache (in addition to having been deleted from the OS DNS cache), then at 222 (FIG. 2B) no match would be found for the IP address in the agent DNS cache, so an alert or other notification would be issued at 227. In that case, the requested connection would be disallowed or at least delayed until some other notification-handling procedure allowed the requested connection to be made.

However, this disallowance or delay would be sub-optimal, in part because, even though there is no guarantee that the domain is still mapped to the IP address, it still may be so mapped. In that case, the connection would meet expectations, so preventing or delaying the connection would be undesirable. Even if the domain is no longer mapped to the IP address, no security issues arises since application 126 conforms to the "Same Origin Policy" under which a web browser (or other application making HTTP connections) permits scripts contained in a first web page to access data in a second web page, but only if both web pages have the same origin. An origin is defined as a combination of URI scheme, host name, and port number. This policy prevents a malicious script on one page from obtaining access to sensitive data on another web page through that page's Document Object Model".

Since the agent DNS entry is deleted no sooner than the corresponding OS DNS entry (i.e., record), the agent DNS cache remains a superset of the OS DNS cache. The agent DNS cache can allow any domain name to IP address translation performed using the OS DNS cache to be reversed using the agent DNS cache. This, in turn, allows domain names to be used instead of IP addresses for network-connection attestation.

"Delete DNS entry" phase 240 of process 200 is flow charted in FIG. 2C. At 241, a TTL expires. The TTL is applicable to a mapping of a domain name to an IP address in OS DNS cache 132 and with a mapping of an IP address to a domain name in agent DNS cache 164. In response to the TTL expiration, at 242, the DNS library of the guest OS deletes the corresponding entry in the OS DNS cache. However, the agent may or may not, depending on the scenario, delete the corresponding entry from the agent DNS cache when the TTL expires.

When a process instance terminates, at 251, any and all instances of its PIID are deleted from the agent DNS cache. At 252, a determination is made whether or not the deleted PIID is the last PIID associated with the requested IP address. If the deleted PIID is the last PIID associated with the requested IP address, then at 253, a determination is made whether or not the associated TTL is valid. If at 253, it is determined that the last PIID associated with an IP address has been or is to be deleted and the TTL has expired, then at 254, the guest agent deletes (or invalidates) the entry including IP address from the agent DNS cache. This completes process 200.

Herein, all art labeled "prior art", if any, is admitted prior art; all art not labelled "prior art", if any, is not admitted prior art. The illustrated embodiments as well as modifications thereto and variations thereupon are provided for by the present invention, the scope of which is defined in the following claims.

What we claim is:

1. A network-connection attestation process comprising:
  populating an Internet protocol whitelist by watching domain-name service (DNS) responses to DNS queries and by examining the domain-name whitelist;
  configuring domain-name entries configured by an administrator using a cloud-based manager user interface;
  pushing said domain-name entries from said cloud-based manager to an agent;
  extracting, by said agent, DNS data from a DNS reply to a DNS query, the DNS data mapping an IP address to a domain name;
  mapping the domain name to the IP address in a DNS entry of an agent DNS cache;
  capturing process data of a process instance of an application process making a network-connection request that specifies the IP address;
  determining the domain name mapped to the IP address in the agent DNS cache;
  associating a process-instance identifier (PIM) for the process instance with the domain name and IP address in the DNS entry, the process data including the PIID, the DNS data further specifying a time-to-live (TTL) during which the mapping between the domain name and the IP address is guaranteed to be valid and, on the expiration of which, the mapping between the domain name and the IP address is no longer guaranteed to be valid, the mapping including mapping the TTL value with the domain name and the IP address in the DNS entry, said TTL applicable to said mapping of said domain name in an IP address in an operating system (OS) DNS cache, and said TTL applicable to a mapping of said IP address to said domain name in said agent DNS cache, upon expiration of said TTL, a DNS library of a guest OS deletes the corresponding entry in said OS DNS cache; and
  attesting to and allowing the connection in an event the domain name is mapped to a process identity in a domain-name whitelist, wherein said domain name is thereby used instead of said IP address to perform said network-connection attestation process.

2. The network-connection attestation process of claim 1 wherein the agent DNS cache contains a superset of the information contained in an OS DNS cache maintained by an operating system (OS) on which the application process runs.

3. The network-connection attestation process of claim 1 further comprising deleting the PIM from the agent DNS cache in response to termination of the application process.

4. A system comprising non-transitory media encoded with code that, when executed by a processor, implements a network-connection attestation process including:
  populating an Internet protocol whitelist by watching domain-name service (DNS) responses to DNS queries and by examining the domain-name whitelist;
  configuring domain-name entries configured by an administrator using a cloud-based manager user interface;
  pushing said domain-name entries from said cloud-based manager to an agent;
  extracting, by said agent, domain-name service (DNS) data from a DNS reply to a DNS query, the DNS data mapping an IP address to a domain identity;
  mapping the domain name with the IP address in a DNS entry in an agent DNS cache;
  capturing process data of a process instance of an application process making a network-connection request that specifies the IP address;
  determining the domain name mapped to the IP address in the agent DNS cache;
  associating a process-instance identifier (PIM) for the process instance with the domain name and IP address in the DNS entry, the process data including the PIID, the DNS data further specifying a time-to-live (TTL) during which the mapping between the domain name and the IP address is guaranteed to be valid and, on the expiration of which, the mapping between the domain name and the IP address is no longer guaranteed to be valid, the mapping including mapping the TTL value with the domain name and the IP address in the DNS entry, said TTL applicable to said mapping of said domain name in an IP address in an operating system (OS) DNS cache, and said TTL applicable to a mapping of said IP address to said domain name in said agent DNS cache, upon expiration of said TTL, a DNS library of a guest OS deletes the corresponding entry in said OS DNS cache; and
  attesting and allowing to the connection in an event the domain name is mapped to a process identity in a domain-name whitelist, wherein said domain name is thereby used instead of said IP address to perform said network-connection attestation process.

5. The system of claim 4 wherein the agent DNS cache contains a superset of the information contained in an OS DNS cache maintained by an operating system (OS) on which the application process runs.

6. The system of claim 4 wherein the network-connection attestation process further includes deleting the PIM from the agent DNS cache in response to termination of the application process.

* * * * *